United States Patent [19]

Scott

[11] Patent Number: 5,178,177
[45] Date of Patent: Jan. 12, 1993

[54] GAS SAVING BACK PRESSURE DEVICE

[75] Inventor: Jesse C. Scott, Bourg, La.

[73] Assignee: Texaco Inc., White Plains, N.Y.

[21] Appl. No.: 922,442

[22] Filed: Jul. 31, 1992

Related U.S. Application Data

[63] Continuation of Ser. No. 819,170, Jan. 6, 1992 abandoned.

[51] Int. Cl.⁵ .......................................... G05D 16/00
[52] U.S. Cl. ........................... 137/14; 137/488; 251/25
[58] Field of Search .............. 137/488, 14; 251/25, 251/26

[56] References Cited

U.S. PATENT DOCUMENTS

3,604,679  9/1971  Pennington .................... 251/26
3,664,362  5/1972  Weise ......................... 137/488 X Primary Examiner—Alan Cohan
Attorney, Agent, or Firm—Jack H. Park; Kenneth R. Priem; Russell J. Egan

[57] ABSTRACT

A back pressure control device is connected to the actuator of a control valve to limit the amount of gas released from the actuator after each actuation. Approximately two thirds of the volume of the actuation gas is retained in the actuator by the subject device after each actuation, this being both the release of a sufficient volume to assure actuation of the control valve while retaining gas which was heretofore wasted.

10 Claims, 1 Drawing Sheet

GAS SAVING BACK PRESSURE DEVICE

CROSS REFERENCE TO RELATED PATENT APPLICATION

This application is a continuation of my earlier application Ser. No. 07/819,170 filed Jan. 6, 1992, now abandoned.

BACKGROUND OF THE INVENTION

THE FIELD OF THE INVENTION

The present invention pertains to a method and apparatus for controlling the amount of gas released during operation of a fluid actuator for a control valve so as to both reduce amount of gas lost during each actuation while saving the environment from contamination by released gas.

THE PRIOR ART

Heretofore it has been the practice to fully vent to atmosphere all actuator gas from a control valve actuator after each and every operation of a fluid or gas control valve. This method of operation requires that the valve actuator then be fully repressurized for the next sequential operation of the control valve, after which the actuator is again fully depressurized by venting the actuator gas to atmosphere once more. This clearly requires the use of a substantial volume of gas, which gas is wasted causing both economic and resource losses as well as unnecessary and possibly damaging release of gases into the environment. Some control valves have been monitored operating as often as 13,000 times a day. Clearly such high rates of operation would have a correspondingly high volume of gas being released from the actuator and, in the context of a gas production field or facility, could cause substantial damage to the environment by such large release of gas.

The subject back pressure device was developed to maintain just enough back pressure, while allowing partial venting of an actuator of a fluid or gas control valve, to enable the valve to close normally. Approximately two thirds of the normal operating volume of gas is retained in the diaphragm chamber of the actuator. Therefore the next time the valve is actuated, it only requires approximately one third of the normal control gas volume to be fed to the actuator to actuate the control valve, due to the fact that the above mentioned two-thirds of the actuator gas volume was retained by the subject back pressure device. Previously the entire volume of the gas in the actuator was bled off to atmosphere each and every time the associated valve was operated. This was a substantial wastage of a valuable resource causing both economic loss as well as possible environmental damage. The subject back pressure device cuts down on pollution of the atmosphere by substantially reducing the amount of gas released and by making it possible for the vented gas to be fed to a vapor recovery unit or the like where it can be trapped and reused or sold instead of being wasted. Thus the present invention provides both economic benefits as well as environmental benefits.

SUMMARY OF THE PRESENT INVENTION

The present invention overcomes to problems of the prior art by providing a method and apparatus which controls the release of actuating gas from a control valve actuator. The subject back pressure device allows approximately only one third of the normal operating gas volume to be released. This still allows a sufficient reduction in the volume of gas to be retained in the actuator to enable actuation of the associated control valve. This limited release of actuator gas results in a lower operating cost, by reducing the amount of gas previously wasted, while protecting the environment from contamination from the unnecessary release of gas.

The subject back pressure control device has a quick acting valve connected between a vessel control device and a control valve actuator. When the vessel control device indicates the need for control valve actuation, the quick acting valve connects the actuator to pressurized system gas or to controlled exhaust means having an adjustable pressure responsive valve which allows a controlled venting of actuation gas until pressure drops sufficiently to allow actuation of the control valve without complete release of the volume of gas in the actuator.

BRIEF DESCRIPTION OF THE DRAWINGS

The present invention will be described, by way of example, with reference to the accompanying drawings, in which.

DETAILED DESCRIPTION OF THE PREFERRED EMBODIMENT

Figure 1:
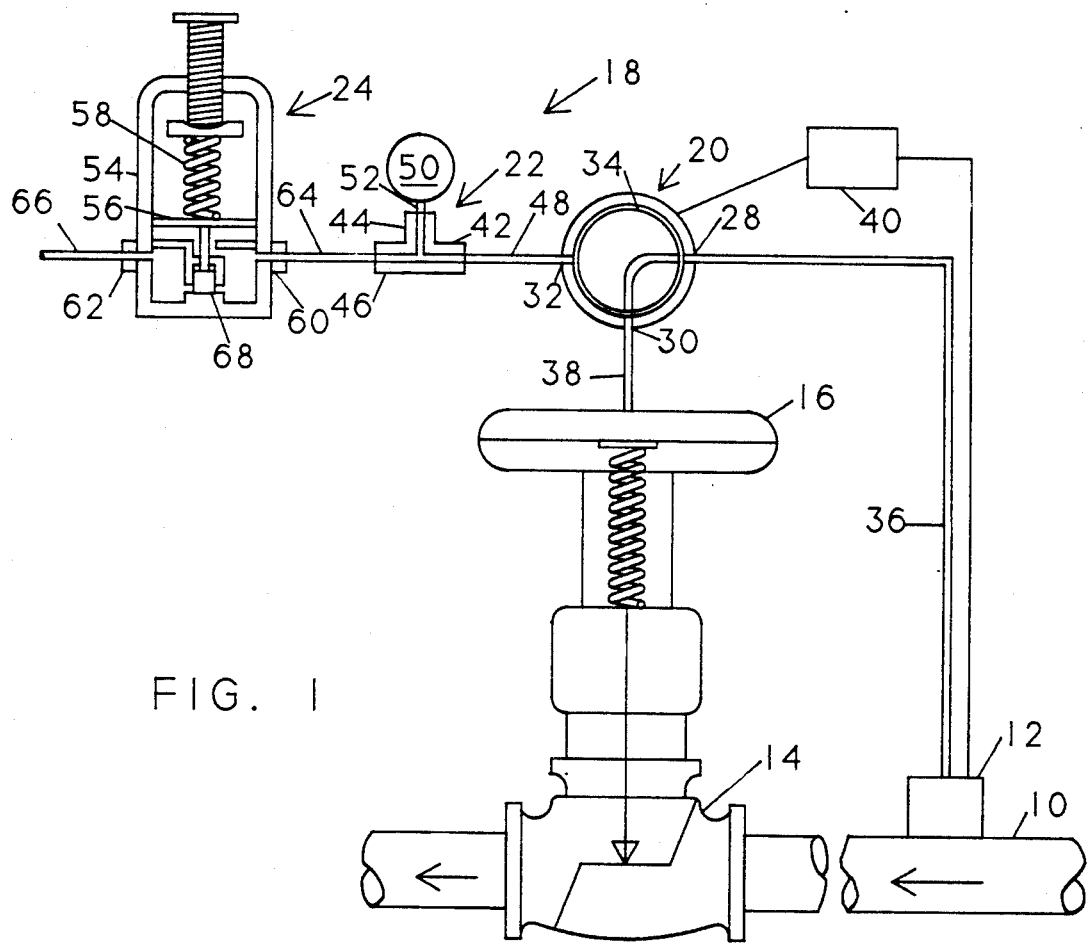
FIG. 1 is a diagrammatic side elevation of the present invention installed on a pressure control valve downstream of a fluid vessel.

The conventional setup and method of operating control valves is to have a vessel 10, shown here as a pipe, equipped with a fluid level or gas pressure control 12. A control valve 14 is located downstream of the vessel and has an actuator 16 attached thereto. The fluid level or gas pressure control 12 is connected to supply actuating gas from the vessel 10 to the actuator 16. At the completion of an actuation cycle of the control valve 14, the entire volume of actuation gas in the diaphragm chamber of the actuator was vented to atmosphere. Subsequent actuations of the control valve 14 required the complete replacement of the volume of actuation gas, which was subsequently vented to atmosphere also. This was a substantial waste of a natural resource, along with the economic loss, and had a deleterious effect on the environment. The present invention was created to obviate both this unnecessary waste of gas and damage to the environment.

Turning now to FIG. 1, the subject gas saving back pressure device 18 has three primary components, namely a quick exhaust relay 20, a coupling 22, and a pressure responsive valve 24. The subject invention is associated with a diaphragm actuator 16 of a control valve 14 which is located downstream from a fluid level control or gas pressure control 12 on a vessel 10.

The relay 20 has a housing 26 with a first input port 28, a second output port 30, a third exhaust port 32, and a valve member 34, here shown as a rotary member adapted to connect either ports 28, 30, in a first position, or ports 30, 32, in a second position. The input port 28 is connected to control 12 by pipe 36. The output port 30 is connected by pipe 38 to the actuator 16 of the control valve 14. Pressure responsive means 40 connected to the quick exhaust relay causes member 34 to move from the first position to the second position upon detecting a change in pressure from the fluid level or gas pressure control 12.

The coupling 22 is a T-shaped member having three intersecting tubular arms 42, 44, 46. Arm 42 is connected to the exhaust port 32 of relay 20 by pipe 48. Arm 44 is connected to pressure gauge 50 by pipe 52.

The pressure responsive valve 24 has a housing 54 having a diaphragm 56 mounted therein so as to be adjustably loaded by screw controlled spring 58. The housing includes input port 60 and exhaust port 62. Port 60 is connected to coupling arm 46 by pipe 64. Exhaust port 62 is either open to atmosphere or connected to a vapor recovery unit (not shown) by pipe 66. The diaphragm 56 carries valve member 68 which moves between a closed first position blocking communication between ports 60 and 62 (as shown) and an open second position connecting ports 60 and 62.

The quick exhaust relay 20 can be of any well known manufacture, such as the Humphry relay Model #QE 2. The pressure responsive valve 24 can also be of any well known type, such as the Fisher Model 167-A 3-way switch valve with one port plugged. The fluid level or gas pressure control 12, the control valve 14, and the actuator 16, while not actual components of the present invention, are also of any well known and commercially available type and thus need not be described in detail here in order to fully understand the present invention.

The fluid level or gas pressure control 12 normally sends pressurized gas from the vessel 10 through the pipe 36 to input port 28 of relay 20, through member 34, output port 30, and pipe 38 to the diaphragm chamber of the actuator 16 for the control valve 14. When the fluid level or gas pressure control 12 senses a condition within the vessel 10 which requires actuation of the control valve 14, a signal is sent from fluid level or gas pressure control 12 to pressure responsive means 40 which, upon sensing a pressure change, causes the relay 20 to rapidly switch from its first condition to its second condition connecting the output port 30 to the exhaust port 32. The actuation gas in the diaphragm chamber of the actuator 16 is vented through the exhaust port 32 to coupling 22 where it is divided between the arms to register its pressure on gauge 50 and pass on to port 60 of the pressure responsive valve 24. This new pressure will act on diaphragm 56 of the pressure responsive valve 24 to move valve member 68 to the open position placing ports 60 and 62 into communication so that the actuator gas will vent to atmosphere through port 62 or, as mentioned above, to a condenser or other known gas recovery means through pipe 66. As the actuator gas is vented, the pressure will drop to a point where spring 58 will cause the pressure responsive valve 24 to change state so that the spring 58 causes valve member 68 to close blocking communication between ports 60 and 62. This pressure can be measured by the gauge 50 and controlled by adjusting the spring 58.

The actuator 16 is conventionally pressurized up to approximately 15 to 20 psi. The back pressure acting on the control valve actuator 16 can be adjusted by the present invention to 10 psi, or whatever pressure that will allow the control valve 14 to close normally, without completely exhausting the gas from the diaphragm chamber of the actuator 16. At this point approximately two thirds of the volume of gas normally required to operate the control valve 14 will be retained in the diaphragm chamber of the actuator.

The present invention may be subject to many modifications and changes, which will become apparent to those skilled in the art, without departing from the spirit or essential characteristics of the present invention. For example, certain pressure signal portions could be replaced with electronic signals with the appropriate changes in hardware to generate and respond to signals in this form. Therefor the present embodiment should be considered in all respects as illustrative and not restrictive of the scope of the invention as defined by the appended claims.

I claim:

1. In combination with a control valve connected to a vessel and responsive to control means sensing at least one condition in said vessel, said control valve having gas operated actuator responding to said control means to actuate said control valve, a back pressure control device connected to control the amount of gas released from said actuator after each actuation of said control valve, said back pressure device comprising:
   relay means connected between said control means, said actuator and exhaust, said relay means in a first position connecting said actuator to said control means and in a second position connecting said actuator to exhaust;
   coupling means connected to said exhaust of said relay means; and
   pressure responsive valve means connected to said coupling means and responsive to pressure of gas from the exhaust of said relay, said pressure responsive valve means having adjustable means to control the pressure at which said valve means will no longer allow release of gas from said actuator, whereby the gas in said actuator is never fully exhausted but only sufficient gas is released from the actuator to allow the control valve to be actuated.

2. The combination according to claim 1 wherein said relay means is a quick exhaust relay.

3. The combination according to claim 1 wherein said coupling has arms connected, respectively, to exhaust of said relay means, to a pressure gauge, and to port means on said pressure responsive valve means.

4. The combination according to claim 1 further comprising:
   pressure gauge means connected to said coupling whereby the pressure setting of said pressure responsive valve means can be determined.

5. The combination according to claim 1 wherein said pressure responsive valve means comprises:
   a housing defining a chamber therein and having a first port connecting said chamber to said coupling and a second port connecting said chamber to exhaust;
   valve means within said chamber movable between a first closed position blocking communication between said first and second ports and a second open position allowing communication between said ports;
   diaphragm means mounted in said housing and connected to actuate said valve in response to pressure admitted to said chamber through said first port; and
   adjustable spring means acting on said diaphragm to control the pressure at which said valve will open and close.

6. A back pressure control device comprising:
   quick acting valve means connecting an actuator of a control valve to either a source of pressurized gas or to exhaust;

coupling means connected to said quick acting valve means and to pressure gauge; and
pressure responsive valve means connected between said coupling means and exhaust and adjustable to close communication with exhaust upon pressure dropping to a predetermined level.

7. A back pressure device according to claim 6 wherein said quick acting valve means has a housing with three ports and a valve member therein, said ports being connected to control means, said actuator, and exhaust respectively, said valve means rapidly moving between a first position coupling said actuator port to said control port and a second position coupling said actuator port to said exhaust port.

8. A back pressure device according to claim 6 further comprising:
pressure gauge means connected to said coupling whereby exhaust gas pressure can be measured 9. A back pressure device according to claim 6 wherein said pressure responsive valve means has a housing defining a diaphragm chamber having a spring loaded diaphragm therein, an inlet port connecting said chamber to said coupling and an exhaust port connected to said chamber, valve means carried by said diaphragm and operative to place said ports into or out of communication or depending upon the pressure of the exhaust gas.

10. A method for controlling the back pressure in an actuator of a control valve so as to retain sufficient gas within the actuator to allow the control valve to actuate without wasting gas through unnecessary venting, said method comprising the steps of:
providing a control valve actuator with back pressure control means having quick acting valve means connected between said actuator and control means, a coupling connected to an exhaust port of said valve means, a pressure gauge connected to said coupling, and pressure responsive valve means connected between said coupling means and exhaust;
setting said pressure responsive valve means to a pressure low enough to allow the control valve to actuate; and
venting only enough gas from said actuator to allow the control valve to operate.

* * * * *